June 25, 1957 W. B. KLEMPERER ET AL 2,796,800
MOTION PICTURE TIME CORRELATING APPARATUS
Filed Sept. 2, 1953 3 Sheets-Sheet 1

INVENTORS
WOLFGANG B. KLEMPERER
AND WEBSTER BLAKE
BY Edwin Coates
ATTORNEY

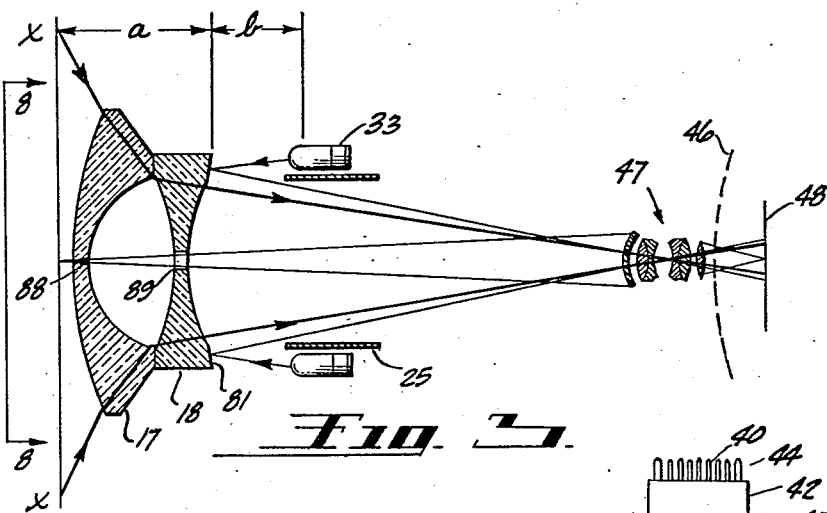
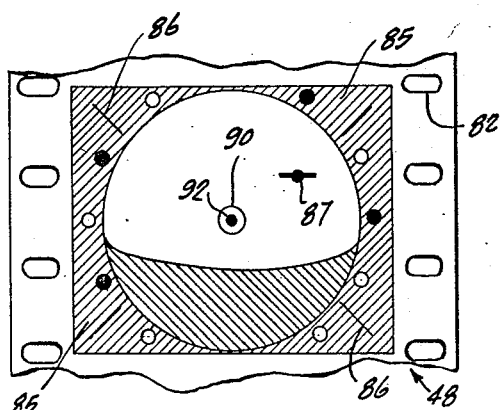
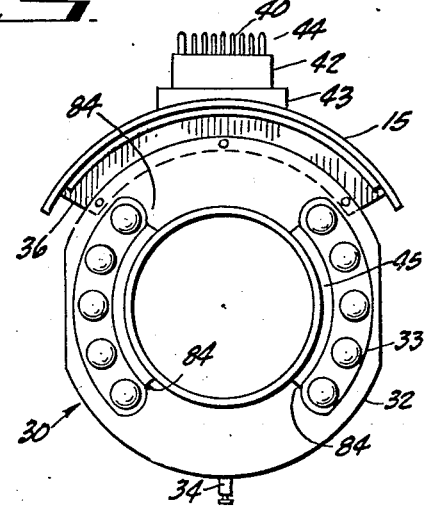
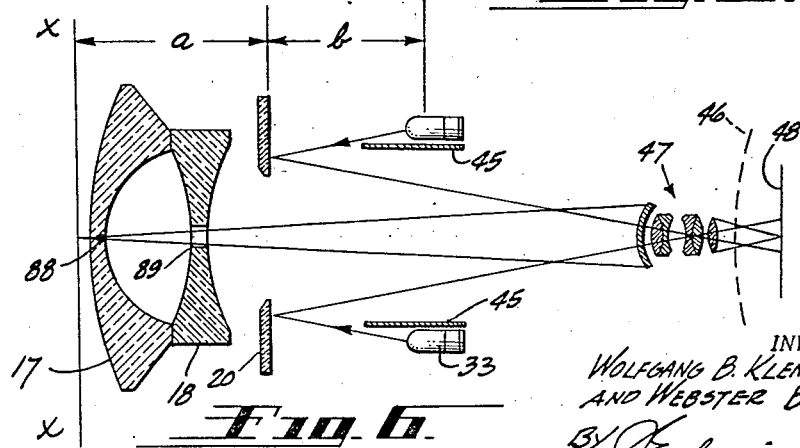

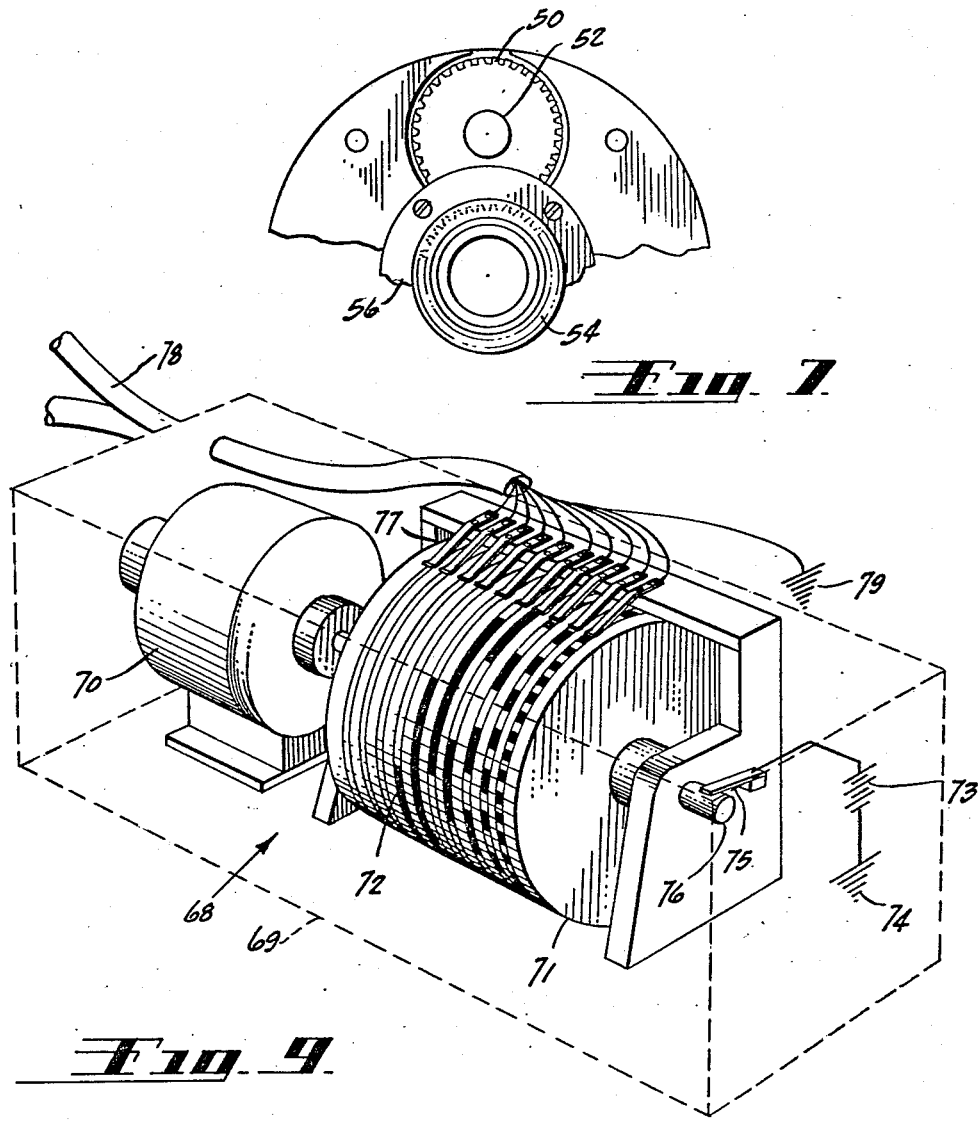

United States Patent Office 2,796,800
Patented June 25, 1957

2,796,800
MOTION PICTURE TIME CORRELATING APPARATUS

Wolfgang B. Klemperer, Los Angeles, and Webster Blake, Pacific Palisades, Calif., assignors to Douglas Aircraft Company, Inc., Santa Monica, Calif.

Application September 2, 1953, Serial No. 378,062

23 Claims. (Cl. 88—16)

This invention relates to accessory apparatus to be used in combination with motion picture cameras. It concerns apparatus for producing time correlation markings on pictures taken by remotely stationed non-synchronized cameras. It is particularly adapted to produce timing signals and to combine such signals with extreme wide angle lens optics, as required for the recording and localizing of rapid events expected to take place in the proximity of such camera stations, but in an unpredictable direction within their respective fields of view.

The apparatus covered by this invention comprises a compact optical accessory unit which is adapted to be attached to a conventional motion picture camera in lieu of its regular objective lens, thereby converting such camera into a time correlating wide angle camera suitable to co-act with other similarly converted cameras to form a "Scoring camera system" of multiple photographic coverage of a large field of view. Such cameras may be mounted on fixed bases or tripods to photograph events occurring within the hemisphere above them or objects coming into or passing through their field of view. Alternatively, such cameras may be mounted on vehicles such as ships or aircraft, to record events occurring anywhere in their vicinity. For instance a plurality of such cameras may be advantageously installed on target drone aircraft to record the passage of missiles fired at them in experimental and practice operations. By mounting cameras at the extremities of an aircraft, such as at the wing tips or in the nose and tail of the fuselage of such aircraft, the distance between two cameras serves as a convenient base line for triangulation calculation of the relative position vectors of any missile passing the aircraft at some distance off said base line, provided the object can be seen and its apparent position in the field of view of two separate cameras can be measured in terms of angular coordinates, and provided instantaneous pictures can be correlated timewise so that appropriate simultaneous values of azimuth and site angles from two view stations can be conjugated.

To accomplish this purpose an apparatus constructed after this invention may comprise an essentially tubular housing, a photographic objective lens at the end thereof adjoining the film camera, a wide angle reducing lens of negative power (hereinafter called scanning lens) which may consist of several air-spaced elements, located at the far end of said tubular housing, a remotely governed time indicator (hereinafter called repeater clock) accommodated therein, and optical means to produce a good image of said repeater clock on parts of the photographic film frame not occupied by the landscape picture produced by the lens system. The apparatus may further comprise a device for adjusting the system to proper focus, means for setting the iris by manipulation from the outside, and means to protect the optics from fogging or icing under adverse environmental conditions. The repeater clocks of all cameras intended to co-act in the recording of the same event are actuated in synchronism by a common master clock in a manner suitable to avoid confusion due to the lapse of time during each exposure, although the individual motion picture cameras are run off independently of each other when they are driven by their individual motors without synchronization between their film movements. Their mechanisms may be of the intermittent shuttle type or of the continuous film movement type, at speeds of tens, hundreds, or thousands of frames per second. The time resolution of the clock should be at least of the order of magnitude of the frame rate.

The apparatus of this invention may further comprise means for producing fiducial markings on each picture for purposes of facilitating measurements to determine the location of an object of interest photographed on such pictures.

The particular type of time clock presentation favored in the present invention consists of an array of gas glow tubes, preferably ten, positioned in two arc groups of five, which are brought into view of the photographic objective lens by a ring mirror in such a manner that their images fall upon the marginal areas of the rectangular film frame just outside the circular image of the landscape view seen through the scanning lens.

By distinguishing between lamps that are lit and those that are off, a different pattern can be recognized for each of the possible combinations of lights. Denoting the number of lamps by the better "$n$," there are $2^n$ such combinations and the corresponding $2^n$ different patterns can be distinguished on the picture; in the case of $n=10$ there are 1024 different patterns. By flashing these lamps in a systematic sequence, 1024 consecutive distinguishable time signals can be emitted from a suitable master time signal generator and repeated over and over after each completion of the cycle. By paralleling the corresponding lamps at all co-acting camera stations they will flash in unison and establish a common time reference except for cycle identification.

If, for instance, the time clock is run to generate one complete cycle per second, new signals flash on at the rate of 1/1024 second or approximately 1 millisecond. Assuming the event to be captured by photography is easily recognized as such and lasts only a fraction of a second, as in the case of an explosion, or a few seconds, this method of time resolution is satisfactory. Otherwise one of the lamps in each unit may be set aside and actuated independently of the master clock but by a separate event marker signal to identify a significant time cycle identically on all camera records.

The advantages of time correlation by common signals over mechanical camera synchronization are the more obvious the greater the camera frame rates that must be employed to capture rapidly elapsing events and the greater the installation difficulties when carrying multiple camera clusters aboard fast-flying or unmanned aircraft.

The features and advantages of this invention will be more apparent from the following description and drawings, in which:

Figure 3 is a partial sectional view of another form of an optical system for the camera attachment of this invention;

Figure 4 is a view showing a typical picture on a frame of film exposed in a camera equipped with the camera attachment of this invention;

Figure 5 is a front elevation view of the lamp assembly when removed from the body of the camera attachment;

Figure 6 is a diagrammatic representation showing the optical inter-relationships among the various components of the camera attachment of this invention and the motion picture camera body to which they are attached;

Figure 7 is a view of the objective lens rackout mechanism on the rear portion of the camera attachment shown in Figure 2, looking in the direction of the arrow 7;

Figure 9 is a perspective view of a master time signal generator for energizing corresponding timing lamps in all co-acting camera attachments in unison.

Figure 2:
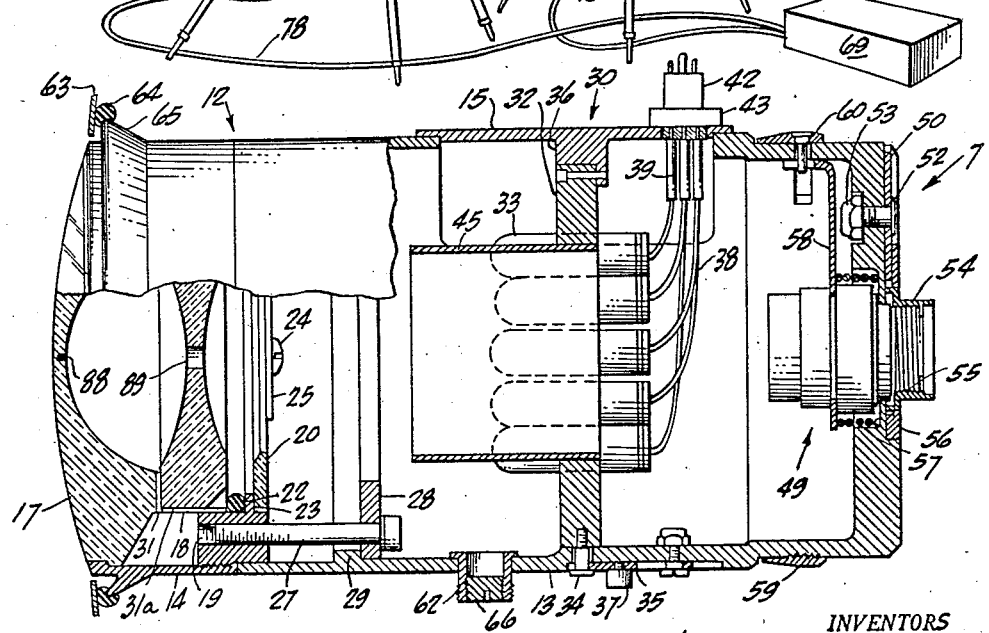
Figure 2 is a side elevation view, partially in section, showing the timer lamp assembly in its relation to one form of optical system.

Referring to Figure 2, the housing structure 12 of the camera attachment comprises the cylindrical body member 13, the scanning lens mounting ring 14, and the light assembly cover-plate 15, all of which are preferably made of metal. The scanning lens assembly, which is mounted on the forward end of the body member 13, is primarily comprised of scanning lens mounting ring 14, forward scanning lens element 17, rearward scanning lens element 18, connecting ring 19, annular mirror 20, and elastic O ring 22. The scanning lens assembly is assembled by placing the forward scanning lens element 17 within the scanning lens mounting ring 14, fitting the O ring 22 snug against the flange 23 in the connecting ring 19 and placing the rearward scanning lens 18 inside the connecting ring as shown. The connecting ring 19 is then screwed into the scanning lens mounting ring 14 until the opposing peripheral faces of lens elements 17 and 18, are in firm contact with each other. Annular mirror 20, its mirror surface facing rearwardly, is then fastened to the inwardly protruding flange 23 by means of screws 24 and plates 25.

The whole scanning lens assembly is fastened to the body member 13 by means of two bolts 27 which pass through the retainer ring 28 into the connecting ring 19. The flange 29 formed in the body member 13 serves as an abutment to restrain the retainer ring 28 against forward movement when the bolts 27 are tightened.

To prevent icing on the inner surface of the forward scanning lens when the camera with attachment is mounted aboard aircraft which may encounter icing conditions in high altitude flights, it is desirable to introduce heated air into the interior of the body member 13 and to cause such air to flow into and out of the space between the scanning lens elements 17 and 18. To do this grooves 31 and 31a may be formed respectively at angular intervals on the rear face of the forward lens element 17 and on the circumfeerntial and rear faces of the rearward lens element 18, as shown in Figure 2. If desired, grooves may be formed in the forward flat face of lens element 18 in addition to or in lieu of the grooves formed in the rearward face of lens element 17.

In the event that there is uneven expansion between the two lens elements 17 and 18 and their surrounding parts 14 and 19, the O ring 22 will serve to maintain the two lens elements snugly in position provided the O ring 22 is sufficiently compressed when screwing the connecting ring 19 into the mounting ring 14.

The central portion of the body member 13 is adapted to receive the light assembly 30, shown in Figures 2 and 5. The upper portion of body 13 is cut away to permit ready insertion and removal of the light assembly 30. The annular plate 32, which is screwed to flange 36 on the cover plate 15, serves as a means for mounting the timing lamps 33. To hold the light assembly 30 firmly in position, anchor pin 34 is engaged by a slot in the slide fastener 35 which is slidably mounted on the body 13. Knob 37, which is connected to slide fastener 35, enables one to move the slide fastener forwardly or rearwardly to lock or unlock light assembly 30 with respect to body member 13.

Insulated wires 38 lead from the ten gas glow lamps 33 to electrical resistors 39 which are in turn electrically connected to prongs 40 of the electrical plug 42. To permit the use of a standard electrical plug, a plug adapter 43 is provided, said plug adapter having a lower surface which fits snugly on the cylindrical surface of cover plate 15. Only one wire lead from each lamp 33 is necessary since the circuit is completed by grounding the lamps through the light assembly 30 and a ground prong 44.

To prevent light emitted from lamps 33 from being reflected from the surfaces of lens elements 17 and 18 onto the exposed frame of the filmstrip, a cylindrical light shield 45 is provided. This shield is fitted and connected to the surface forming the circular hole in the annular plate 32. As best shown in Figure 6, the length and diameter of shield 45 are such that light produced by the lamps 33 is obstructed from passing through the hole formed in the annular mirror 20 and is thus prevented from being reflected from the surfaces of lens elements 17 and 18, through the objective lens elements 47, and onto the exposed frame of the film strip 48.

The rearmost portion of the camera attachment of this invention serves the functions of housing the objective lens elements 47 and their accessories and of adapting the camera attachment for mounting on a motion picture camera body 46. The objective lens elements 47 are housed in three cylinders indicated by the arrow 49 in Figure 2. Referring to Figures 2 and 7, the lens rackout control gear 50 is rotatively mounted in a recessed space in the rear face of body member 13 by means of stud 52 and nut 53. The teeth of rackout gear 54 are meshed with the teeth of gear 50. The threads 55 formed in the inner surface of the shank portion of rackout gear 54 are adapted to receive matching threads on a portion of one of the objective lens housing cylinders 49, which are prevented by a protuberance from rotating. Retaining ring 56 is mounted on the rear face of body member 13 and has a shoulder, as shown, retaining rackout gear 54. Retaining ring 56 thus retains and positions the lens mounting cylinders 49 since they are threadedly engaged with gear 54.

To adjust the rackout of the objective lens elements the operator may manually rotate the rackout control gear 50, which will cause rotation of rackout gear 54 and in turn move the objective lenses 47 forwardly or backwardly, depending on the direction of rotation given to gear 50. This rackout system permits the operator to obtain the desired focus on the film strip 48 of light passing through the objective lens elements 47. To assure better focusing accuracy it has been found desirable to include a spring 57, acting between the rear face of body member 13 and the forward pair of lens housing cylinders 49 through the iris adjustment yoke 58. This spring operates to maintain the lens elements 47 in the most forward position allowed by the then-existing rackout adjustment, despite slack resulting from the accumulation of manufacturing tolerances.

An iris diaphragm, comprising a plurality of thin opaque plates, is contained in the rearmost lens housing cylinder 49 and the aperture formed by these plates is adjustable by rotation of the iris adjustment yoke 58 which is connected mechanically to a conventional iris diaphragm adjusting ring. The aperture control ring 59 is threaded onto the body member 13. The stud 60 is threaded into the aperture control ring 59 and rides in a groove in the iris adjustment yoke 58, so that manual rotation of ring 59 causes rotation of yoke 58 which in turn accomplishes adjustment of the iris aperture as previously described.

In the event that the camera attachment of this invention is to be used under icing conditions, which may occur in high altitude airplane flights, it is desirable to provide a means for preventing the formation of fog or ice on any of the lens surfaces. To do this the body member 13 may be fitted with air inlet and outlet plugs 62, such as the one shown in Figure 2. The outer portions of plugs 62 are threaded to receive threaded hose couplings on inlet and outlet air hoses, which are not shown. Any convenient source of heated air may be used in connection with the inlet hose.

To prevent rapid dissipation of heat from body member 13 under icing conditions, it is desirable to seal the body member 13 connecting junction with its housing structure. A portion of such a housing structure is shown as 63 in Figure 2. An elastic O-ring 64 is fastened on the inner edge of a hole formed in the housing structure, as shown, to mate with a lip 65 formed on the forward end of body member 13. When the lips 65 of the camera attachment are jammed against the O ring 64, cold air outside of the housing structure 63 will be prevented from entering the housing structure and dissipating heat from the interior of body member 13.

In order to reduce the humidity in the body member 13, a desiccator 66 filled with a moisture absorbing substance such as silica gel may be connected to the housing member.

Figure 1:
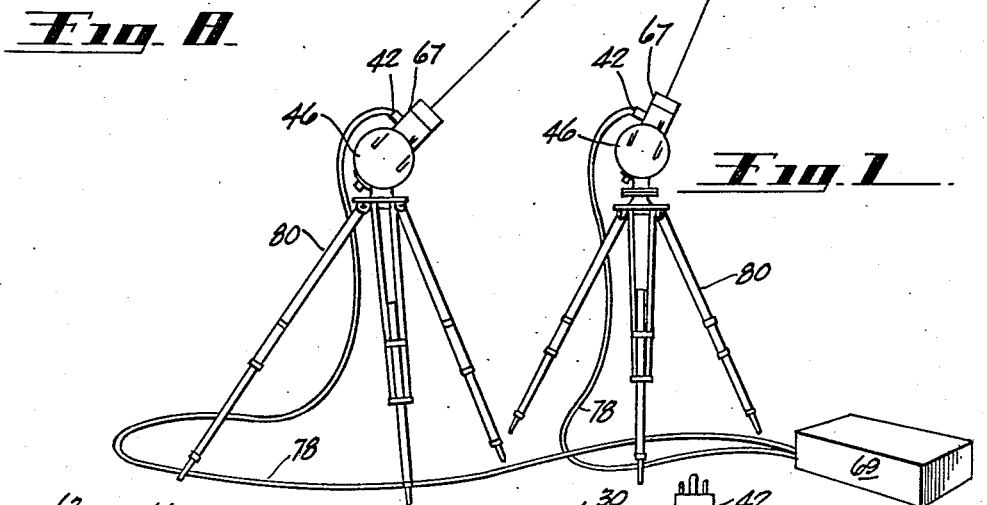
Figure 1 is a generally diagrammatic perspective view of two tripod-mounted cameras set up in conjunction with the apparatus of this invention to photographically record the passage of a moving object.

Referring to Figure 1, generation of the electrical impulses for simultaneously energizing correspondingly located glow lamps 33 in two or more camera attachments 67 may be accomplished by an ordinary electrical impulse generating mechanism enclosed in box 69. A suitable source of electrical impulses 68, as shown in Figure 9, may consist essentially of a motor 70 driving a commutator 71 carrying a number of segmental contact takeoff rings 72 equal in number to the number of glow lamps 33 in each camera attachment. Electrical energy is supplied to the contact rings 72 by a source of electrical energy, such as battery 73 grounded at 74, through brush 75 riding on shaft 76 which is in turn electrically connected to all the contact rings 72. Brushes 77 riding on the commutator rings 72 take off intermittent impulses of electrical energy from the rings when the motor 70 is running, in such combination as required to vary the pattern systematically through each cycle, in such a manner that consecutive combinations will not blend to be confused as a pattern associated with a different time. Electrical conductors 78 lead from the brushes 77 to the electrical plugs 42 which, as previously described, are in turn electrically connected by wires 38 to glow lamps 33. Each set of conductors 78 includes a wire leading to ground 79 for completion of the circuit from the generating mechanism 68 to the glow lamps 33 and back to the generating mechanism. In order to provide simultaneous energization of corresponding glow lamps in the two camera attachments 67 shown in Figure 1, the electrical conductors 78 leading to each pair of correspondingly located lamps in the two attachments are electrically connected to the same brush 77 in the generating mechanism.

Each timing attachment 67 is mounted at its rearward end portion on the forward end of a camera 46 which in turn is mounted on a structure such as the tripod 80 shown in Figure 1. To simplify triangulation calculations which make use of the film strip records obtained by operation of the cameras 46 and the timing apparatus of this invention, it is desirable to mount pairs of cameras 46 so that their aiming axes lie in a common, binoptic plane and at a substantial angle from the base line between the two camera stations. Where the cameras are to be mounted on an airplane, it is often desirable to mount a cluster of camera and timing attachment combinations on each wing tip of the airplane to obtain as large or complete coverage of the spherical field around it as possible.

Where it is desirable that a limited number of cameras cover a large or complete field of view an extremely wide angle scanning lens combination comprising lens elements 17 and 18 is advantageous provided the inevitable smallness of the object image is tolerable. The wider the field angle covered by the lenses, the more reduced the image of the object to be photographed, thus resulting in a shorter effective range of the cameras. Moreover, extreme field angle coverage of the scanning lens combination entails distortion of the image which it produces but this can be coped with by calibration and appropriate computational steps in the triangulation procedure and is, in many respects, less troublesome than an excessive multiplicity of small angle cameras along one station.

Proceeding further with the description of the optical function of a typical unit comprising a camera 46 and its timing attachment 67 with a wide angle scanning lens, as the object passes the field of view of the scanning lens, light reflected from the object is refracted by the scanning lens as though forming a virtual image in the plane x—x, shown diagrammatically in Figure 6. This light then passes through the space within the annular mirror 20 and the light shield 45 and is further refracted by the objective lens elements 47 to be focussed on the frame of the film strip 48 in the camera 46. Concurrently with the exposure of the inner or central part of the film-strip frame to the outside field of view the outer or marginal part of the film sees through the mirror 20, the array of gas glow lamps 33 which are lit up in accordance with a time pattern determined by the configurations of the several segmental contact rings. The light shield 45 prevents the light emitted by any of the lamps 33 from passing through the hole in the annular mirror 20 so that no light will be reflected from the surfaces of the scanning lens elements 17 or 18, through the objective lens assembly 47 onto central portions of a frame of the film strip 48. An image of the array of lamps 33 is reflected by the mirror 20 and is focussed by the objective lens assembly 47 onto the peripheral part of the frame of film strip 48. Lamps that are lit thus produce recognizable spots in a clear pattern on a film strip provided the distances "$a$" and "$b$," shown in Figure 6, are approximately equal. The reason for this is that the objective lens assembly 47 is focused on the virtual image plane $x$—$x$ to obtain clear pictures of the distant field of view. The objective lens elements 47 are focussed on the virtual image plane by manual manipulation of lens rackout control gear 50 in a preinstallation bench operation during assembly.

In case "$a$" is only approximately but not precisely equal to "$b$" it is not necessary to focus on the lamps 33 as sharply as through the scanning lens on a distant landscape so long as the light spots shown by the developed film are readily discernible and distinguishable from one another.

The mirror surface may be produced directly on the back face rim 81 of the rear scanning lens element 18, as shown in Figure 3, instead of on a separate structure 20 as previously described. It is also possible to make the mirror either slightly spherical, as shown in Figure 3, or toric instead of flat and thus accommodate somewhat different radial lamp positions and optically compensate for some disparity between the dimensions "$a$" and "$b$." This may favor better packaging of the components of the apparatus.

It is, of course, important that the lamps 33 and the mirror 20 be located with respect to each other and the objective lens assembly 47 so that the light originating with the lamps 33 impinges only on the marginal areas of each frame of the film strip 48, so that the light spots thus produced will not interfere with any image of the external field of view.

In the procedure of deriving quantitative measurements of the position of a photographed object with relation to the camera stations or camera-mounting vehicle by triangulation, the first step is to read the apparent positions of the object image 87 on individual pictures in terms of suitable coordinates. Referring to the portion of film 48 shown in Figure 4, although the edges of the film and the film sprocket holes 82 define such a coordinate system at least in terms of the film orientation, it is often desirable to define a zero reference independently of any possible longitudinal or lateral slack in the film travel over the sprockets by means of a fiducial marking produced photographically on each film frame. Here the same problem arises as with the time indicator, namely to obtain a sharply focussed image of a nearby mark or object. Again, the property of the negative power scanning lens combination, 17 and 18, which produces a virtual image closely ahead of it and permits the objective lens combination 47 to be focused on a nearby plane, as plane x—x, can be exploited by having images 86 of suitably illuminated cross hair lines 84 or similar fiducial markings on a structure in the approximate plane of the lamps 33 show up sharply on the marginal area 85 of the frame of film 48. However, it has been found that an even simpler method of producing a fiducial mark on the film frame, not involving a mirror, can be made to give satisfactory results. This method consists in providing a mark 88 at the center of the forward scanning lens element 17 and in providing a hole 89, slightly larger than the mark, at the center of the rearward scanning lens element 18. The preferred way of making the mark 88 is to drill a small hole into the lens element 17 at the center of its rear face and fill the hole with a suitable light obstructing or refracting substance, such as black paint or some other opaque substance.

The mark 88 is thus located very near the virtual image plane x—x on which the objective lens combination 47 is to be focused for taking pictures of the landscape field. Thus, when the objective lens combination 47 is at its proper rackout position for taking such pictures it will also be in approximately the proper rackout position for sharply focussing images 92 of the mark 88 on the centers of the pictures. Without the hole 89 in scanning lens element 18 the mark image 92 would not be sharply focused on the film because the objective lens combination 47, in its proper rackout position, is itself focused on the plane x—x. The hole 89 in scanning lens element 18 also serves another function: it destroys the focus of the overall lens combination on the center of the landscape field to create an out-of-focus image 90 of the center of the landscape at the center of each picture. This out-of-focus image or halo 90 causes the image 92 of mark 88 to stand out regardless of whether the landscape background is light or dark.

Figure 8:
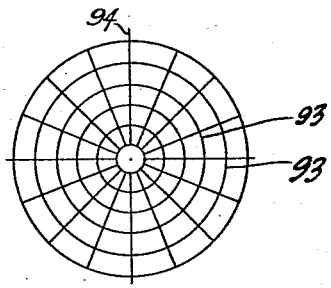
Figure 8 is a view of the forward scanning lens element of Figure 3, taken on line 8—8 of Figure 3.

It has also been discovered that under certain conditions of light, film sensitivity and camera speed permitting adequate exposure at a small iris setting, the depth of field of the system is sufficient to reproduce fiducial marks such as latitude circles 93 and cross hairs 94 scribed or etched on one of the scanning lens element surfaces, as shown in Figure 8, in sufficient resolution for measuring purposes.

From the above description it may be seen that we have devised a new apparatus for use in the process of photographing a moving object so that the time of the exposure of each frame of film may be determined relative to an arbitrary starting time, and that when two or more cameras are operated in conjunction with this apparatus the flight history of the moving object is ascertainable from the film records alone. The method of operating this new apparatus is comprised primarily of the following steps: (1) continuously photographing a moving object on the central portions of the frames of a motion picture film strip, (2) concurrently therewith emitting a series of distinguishable arrays of light, and (3) directing and focusing these arrays of light in a manner which will cause them to form distinct and separate spots of light on the marginal areas of the film frames. By the use of this apparatus the time at which each frame was exposed may be determined by comparing the location and number of light spots on the margin of the frame with the time pattern of the electrical impulses obtainable from the particular configurations of the contact rings used in the generator. Any means of emitting the arrays of light may be used, such as a means for arcing electricity across an air gap, so long as the time of beginning and ending of the illumination of any one array of light may be adequately controlled. Similarly, any means may be used to direct and focus the distinguishable arrays of light onto the marginal areas of the film frames. For instance, where space limitations require it, a series of mirrors or prisms may be used to direct the light rays to the proper marginal spots on the film frames and any combination of lens elements may be used for focusing. The camera attachments shown in the drawings merely illustrate the presently preferred apparatus of this invention.

Although the now preferred embodiments of the present invention have been illustrated and disclosed herein, it is to be understood that the invention is not to be limited thereto for the same is susceptible to changes in form and detail within the scope of the appended claims.

We claim:

1. In combination with a motion picture camera containing film, an optical assembly comprising a substantially tubular housing mounted at one end on said camera, a photographic objective lens element in said housing at its camera adjoining end, a wide angle negative power scanning lens element in said housing at its opposite end for focusing a landscape image on the central area of a portion of said film, mirror means, and time indicating means; said mirror means and time indicating means being disposed in said housing between said objective and negative lens elements and being arranged so that the mirror image of the time indicating means is photographed on the marginal area of said portion of said film surrounding said central area.

2. In combination with a master timer and a plurality of motion picture cameras each of which contains photographic film, a plurality of optical assemblies each comprising a substantially tubular housing mounted at a first end on one of said cameras, a photographic objective lens element in said housing at said first end, a wide angle negative power scanning lens element in said housing at its opposite end for focusing successive lengthwise frame portions of said film, mirror means, and time indicating means; said mirror means and time indicating means being disposed in said housing between said objective and negative lens elements and being arranged so that the mirror images of the time indicating means are photographed on the marginal area surrounding said central area of said successive portions of said film; all of the plurality of said time indicating means being actuated in unison by said master timer.

3. An optical assembly for use with a film-containing camera, comprising a substantially tubular housing containing a photographic objective lens element at one end thereof, a wide angle negative power scanning lens element at an opposite end of the housing, and between these lenses a mirror and time indicating means so arranged that an image of the time indicating means is reflected by the mirror through the objective lens.

4. The combination as claimed in claim 2 wherein each of said time indicating means comprises an array of gas glow lamps.

5. An optical assembly as claimed in claim 3 including iris diaphragm means forming an aperture in the said one end of the housing and means for varying the size of said aperture, said means being accessible from the exterior of said housing.

6. An optical assembly as claimed in claim 3 including means for adjusting the forward-rearward axial position of said objective lens element relative to said scanning lens element, comprising a rackout control gear meshed with a rackout gear having threads formed thereon, housing means for said objective lens element having threads formed thereon which mate with said rackout gear threads, retaining means for retaining and positioning said lens housing means, means for preventing rotation of said objective lens housing means, and means for continually applying an axially-directed substantially constant force against said objective lens housing means for taking up any slack which may exist between said tubular housing, retaining means, rackout gear, and said objective lens housing means.

7. Optical apparatus for use with a camera containing film, comprising substantially tubular housing means containing objective lens means at its one end, containing wide angle negative power scanning lens means at its opposite end, and containing, between said objective lens means and said scanning lens means, light reflecting means and time indicating means so arranged that when said apparatus is attached to said camera with said camera photographing a landscape picture in good focus on a central area of a portion of the film, the light reflecting means reflects an image of the time indicating means in good focus on an area of said film marginal to said central area.

8. Optical apparatus as claimed in claim 7 wherein said scanning lens means comprises a plurality of lens elements forming an air space between an adjacent pair of said lens elements, at least one of said pair of lens elements including a groove therein to provide a passageway for communication of air between said air space and the interior of said tubular housing means, means adapted to receive heated air into the interior of said housing means, and means adapted for passing air out of the interior of said housing means.

9. Optical apparatus as claimed in claim 7 wherein said scanning lens means comprises a plurality of lens elements forming at least one air space between an adjacent pair of said lens elements, an air communicating passageway between said air space and the interior of said tubular housing means, means adapted to receive desiccated air into the interior of said housing means, and means adapted for passing air out of the interior of said housing means.

10. An optical camera accessory to adapt a film-containing camera to take wide field-angle coverage photographs clearly marked with indicia of their times of exposure, comprising housing means adapted to be mounted at its rearward end on said camera, said housing means containing objective lens means at its rearward end, containing at its forward end wide angle negative power scanning lens means, containing time indicating means between its rearward end and said negative lens means, and containing a mirror so disposed forwardly of said time indicating means and so configured that it produces a mirror image of said time indicating means in good focus on a marginal area of a portion of said film when said accessory is mounted on and operated in conjunction with said camera when photographing a landscape picture in good focus on an area of said film central to said marginal area.

11. An optical camera accessory as claimed in claim 10, wherein said mirror is ring shaped to provide an opening therein to permit passage of light through said scanning lens means onto said film.

12. An optical camera accessory to adapt a film-containing camera to take wide field-angle coverage photographs clearly marked with indicia of their times of exposure, comprising housing means adapted to be mounted at its rearward end on said camera, said housing means containing objective lens means at its rearward end; a wide angle negative power combination of lens elements at the forward end of the housing means, one of said lens elements having a rearwardly facing peripheral surface; time indicating means between said rearward end and said combination of lens elements; and a mirror facing on said peripheral surface; said mirror facing and time indicating means being so disposed and configured that said mirror facing produces a mirror image of said time indicating means in good focus on a marginal area of a portion of said film when said accessory is mounted on and operated in conjunction with said camera when the camera is photographing a landscape picture in good focus on an area of said film central to said marginal area.

13. An optical camera accessory as claimed in claim 10 wherein said time indicating means comprises an array of gas glow lamps.

14. An optical camera accessory as claimed in claim 10, including light-shielding means to prevent said scanning lens means from producing a reflected image of said time indicating means on the central area of a portion of said film.

15. An optical camera accessory as claimed in claim 10 wherein said time indicating means is an assembly which includes means adapting said assembly to be readily separated and removed from said housing means.

16. The combination as claimed in claim 1 wherein said scanning lens element is provided with means forming a reference marking on one surface thereof.

17. An optical assembly as claimed in claim 3 wherein said scanning lens element is provided with means forming a reference mark on a surface thereof.

18. An optical assembly as claimed in claim 3 wherein said scanning lens element is provided with means forming a reference mark on the center of one surface thereof.

19. An optical camera accessory as claimed in claim 10 wherein said scanning lens means comprises a forward lens element and a rearward lens element, said forward lens element including means forming a reference mark at the center of one surface thereof, said rearward lens element having a hole at the center thereof.

20. An optical camera accessory as claimed in claim 10 wherein said scanning lens means comprises a forward lens element and a rearward lens element, said forward lens element including means forming a small reference mark at the center thereof, said rearward lens element having at its center a hole substantially larger than said reference mark.

21. An optical assembly as claimed in claim 3 wherein said scanning lens element includes means forming reference grid lines on one surface thereof.

22. Optical apparatus for use with a camera containing film, comprising: a generally tubular housing adapted to be attached at one end to said camera; objective lens means in said housing near said one end; wide angle negative power scanning lens means in said housing at the end opposite said one end, said scanning lens means including forward and rearward lens elements, said objective and scanning lens means serving to focus a landscape image on a central portion of said film; time indicating means on said housing and projecting an image of said indicating means through said objective lens to the marginal area about the landscape image in focus; a reference mark on the forward lens element for producing a fiducial mark on the film; and said rearward lens element having means for causing said reference mark to be sharply focused on the film.

23. Optical apparatus for use with a camera containing film, comprising: a housing adapted to be attached at one end thereof to the camera; objective lens means in said housing near said one end; wide angle negative power scanning lens means in said housing at the end opposite said one end, said scanning lens means including forward and rearward lens elements, said objective and scanning lens means serving to focus a landscape image on the film; a reference mark on the forward lens element, and said rearward lens element being provided with means effecting good focus of the reference mark on the film at a point within the limits of the landscape image; and time indicating means on said housing and projecting time indicating marks on the film about the periphery of the landscape image.

References Cited in the file of this patent

UNITED STATES PATENTS

| | | |
|---|---|---|
| 547,243 | Colvin | Oct. 1, 1895 |
| 1,779,853 | Paulus et al. | Oct. 28, 1930 |
| 1,955,590 | Lee | Apr. 17, 1934 |
| 2,160,006 | Thompson et al. | May 30, 1939 |
| 2,582,085 | Tolle | Jan. 8, 1952 |

FOREIGN PATENTS

| | | |
|---|---|---|
| 565,672 | France | Nov. 9, 1923 |
| 605,884 | France | Feb. 26, 1926 |
| 673,007 | Great Britain | May 28, 1952 |